Sept. 27, 1949.                J. A. PHINNEY                 2,482,866
              PRODUCTION OF CARBON MONOXIDE AND HYDROGEN
                          Filed Nov. 1, 1944
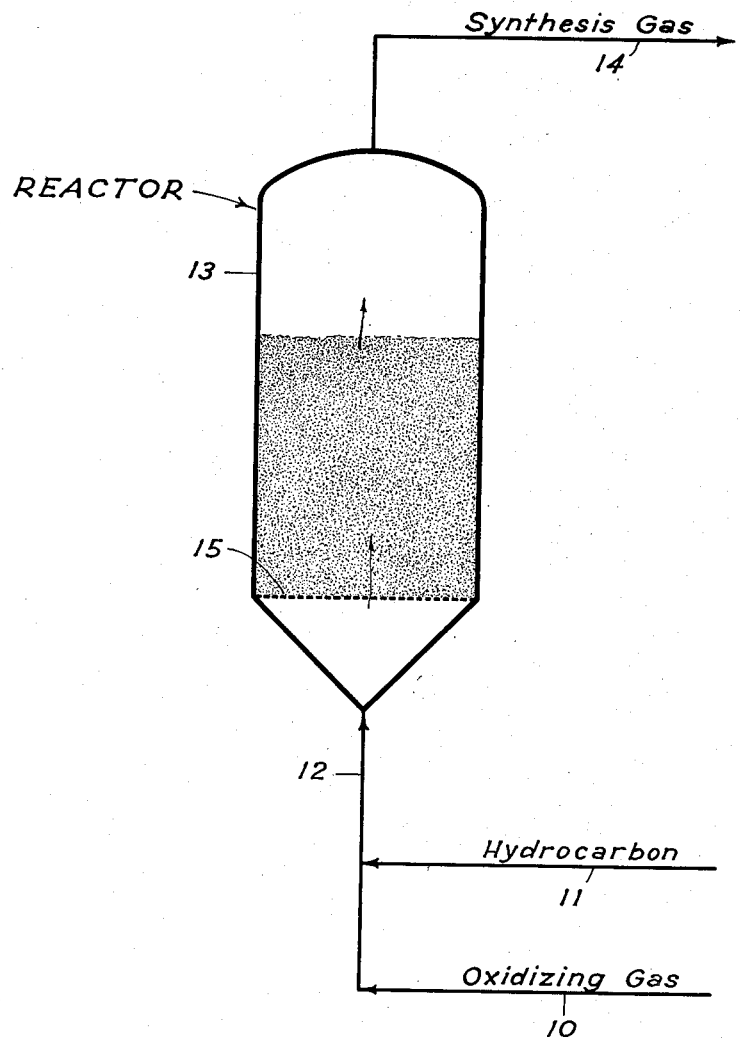
Inventor:—
John A. Phinney
By Everett A. Johnson
        Attorney Patented Sept. 27, 1949

2,482,866

UNITED STATES PATENT OFFICE 2,482,866

PRODUCTION OF CARBON MONOXIDE AND HYDROGEN

John A. Phinney, Tulsa, Okla., assignor to Stanolind Oil and Gas Company, Tulsa, Okla., a corporation of Delaware Application November 1, 1944, Serial No. 561,352

1 Claim. (Cl. 252—373)

This invention relates to process and apparatus for generating gas for use in chemical reactions. More specifically, my invention relates to the generation of mixtures of hydrogen and carbon monoxide from hydrocarbons and oxygen-containing gases. My invention also relates to the reforming of hydrocarbon compounds particularly gaseous hydrocarbons which are constituents of natural gas, natural gasoline, refinery fuel gases, and the like. These materials comprise suitable feeds for my gas-generating process.

Heretofore many methods and means have been proposed for the oxidation of hydrocarbons, such as methane, to produce mixtures of hydrogen and carbon monoxide. In most cases, however, it has been necessary to preheat the feed to initiate the reaction and also to provide special means for extracting heat from the reaction zone. Such prior methods and means have been unsatisfactory or unduly complicated for one reason or another in attempting to obtain the desired reaction control and hydrogen to carbon monoxide ratios.

Therefore, it is an object of my invention to provide method and means for the production of hydrogen and carbon monoxide mixtures in controlled ratios and at controlled optimum equilibrium temperatures. A further object is to provide a system wherein preheating of the feed is unnecessary. An additional object is to provide a system wherein the equilibrium reaction temperature can be adjusted. Another object is to provide method and means for removing the products at equilibrium temperature whereby the excess heat is dissipated from the reaction zone. Other objects and advantages of my process will become apparent to those skilled in the art as the description thereof proceeds.

Briefly, according to my process, I contact natural gas, methane, or the like together with an oxygen-containing gas such as air with a finely-divided solid maintained at an equilibrium reaction temperature. The solids are finely divided and are maintained in a dense turbulent suspended phase within a reaction zone. The amounts and proportions of gas-making fluids are so controlled that the desired gas-making temperature is maintained within the contacting zone, and the operation is substantially continuous.

In the generation of gas mixtures comprising hydrogen and carbon monoxide by the reaction of methane with oxygen-containing gases, the following two mechanisms occur:

(I) $CH_4 + .5O_2$ yields $CO + 2H_2$ (II) 

In Reaction I heat is evolved to the extent of approximately 35,000 B. t. u. per 1,000 cubic feet of methane consumed. Reaction II produces about six times that amount of heat. The extent to which the two reactions take place is dependent upon the temperature level, Reaction II being predominant at low temperatures, and Reaction I at high temperatures. When the methane and oxygen-containing gas are commingled at room temperature and made to react in contact with preheated finely-divided solids in a dense turbulent suspended phase, an equilibrium condition is reached wherein the heat evolved from Reactions I and II is dissipated as sensible heat in the reaction products. The equilibrium can be attained by employing a suitable fluidized solid catalyst. The catalyst is preferably a group VIII metal which may be supported on a carrier such as clay, Super Filtrol, kieselguhr, silica gel, alumina, etc., or may be unsupported metal, such as iron particles. Nickel on alumina is particularly useful. The group VIII metal catalyst, whether supported or not, can be promoted by metals or oxides of metals including aluminum, magnesium, calcium, uranium, chromium, molybdenum, vanadium, etc.

If the mixture $1CH_4$ and $0.5O_2$ is caused to react, Reactions I and II will both occur until the oxygen has been used substantially completely. An equilibrium is finally reached between $CH_4$, $H_2$, $CO$, $CO_2$, and $H_2O$. The relative proportions of the constituents in this equilibrium mixture will depend upon the pressure and temperature. Increasing the temperature favors Reaction I and results in the production of more $H_2$ and $CO$ with less $CO_2$, $H_2O$, and $CH_4$. Increasing the pressure retards the production of $H_2$ and $CO$ and favors the production of $CO_2$, $H_2O$, and $CH_4$.

In accordance with my invention, the $CH_4$ and $O_2$ are introduced to the fluidized catalyst chamber without preheat, and no heat is added from outside sources during the reaction. Therefore, the temperature of the reaction chamber, and consequently the temperature of the reaction, depends only upon the heat liberated in the methane conversion. A special condition is created in this way which would not occur if outside heat were added. That is, the quantity of oxygen used becomes critical. If not enough $O_2$ is added, a low reaction temperature occurs which favors Reaction II over Reaction I and results in a considerable quantity of unconverted $CH_4$. If too much $O_2$ is used, the temperature will be high enough to favor Reaction I, but part of the $CO$ and $H_2$ will be burned to $CO_2$ and $H_2O$. The object is to use enough $O_2$ to convert most of the $CH_4$ and produce as high a temperature as possible without adding enough $O_2$ to convert the CO and $H_2$ to $CO_2$ and $H_2O$.

At atmospheric pressure, use of 0.5 mole of $O_2$ per mole of $CH_4$ will result in a temperature of about 1360° F. with a product gas of which $H_2$ and CO comprise about 92% in the approximate ratio of two moles $H_2$ to one mole CO. This mixture also contains about 6% $CH_4$. This is a very satisfactory composition. However, in practical commercial installations, pressures in excess of atmospheric are used. As noted before, these pressures will suppress Reaction I and result in a less satisfactory yield of CO and $H_2$. Therefore, at ordinary reaction pressures of approximately 30 p. s. i. gage, use of about a 20% excess of $O_2$ over the stoichiometric quantity indicated by Reaction I is proposed, i. e., 0.6 rather than 0.5 mole $O_2$ per mole $CH_4$. This results in a temperature of about 1530° F. and a product gas which again contains about 92% $H_2$ and CO in a 2:1 ratio. For higher pressures more excess oxygen should be used, and for lower pressures less excess oxygen.

Similarly the addition of oxygen in excess of the stoichiometric ratio of one mole methane to 0.5 mole oxygen may be employed to compensate for the presence of inert diluents, such as nitrogen, or hydrogen and CO recycled from the product recovery system of a synthesis plant.

Referring to the drawing, oxygen-containing gases are supplied at substantially room temperature by line 10, and a hydrocarbon-containing gas is supplied by line 11, the mixture being introduced by line 12 to a low point in the reactor 13. Such introduction may be through a distributor plate 15. Suitable means will be employed, of course, for introducing and removing catalysts from the reactor 13, but such means are well known and are not illustrated in the drawing. It should be understood that the reactor 13 is digrammatically illustrated and that it may take other forms without departing from the spirit of this invention. Within the reactor 13 a quantity of finely-divided contacting material is maintained in a dense turbulent suspended phase.

In the fluid-solids technique, the solids of finely-divided particle size are fluidized by upflowing gasiform material within the gas generation zone so that the contacting material is maintained as a dense turbulent fluidized phase. The turbulence of the suspended particles permits maintaining uniform temperature throughout the entire contacting mass and permits the withdrawal of the evolved heat with the product gases. With solid particles of the order of 2 to 200 microns or larger, preferably between about 20 and 100 microns, vertical gasiform fluid velocities of the order of about .4 to 4, preferably 1 to 3, specifically about 1.5 feet per second are employed. At these velocities a liquid-like dense phase of solids is obtained in which the density is between about 30 and about 90%, preferably between about 40 and 80%, e. g., about 60% of the density of the settled contacting material. An equilibrium temperature depending upon the hydrocarbon to oxygen ratios is readily maintained within zone 13, and the synthesis gas generated by the reforming of the hydrocarbons is removed by line 14.

From the above it will be apparent that I have attained the objects of my invention and have provided a useful method and means for producing synthesis gas by the reaction of methane with oxygen in the presence of a finely-divided solid which is maintained in a dense turbulent suspended phase. An advantage of this type of system over the fixed-bed system is that in a fixed bed sufficient preheat of the reactants must be carried out to insure the initiation of the gas-generation reaction. Prior systems did not permit charging of the reactants at room temperature unless expensive and cumbersome means for adding extraneous heat to the bed inlet were provided. It is therefore apparent that the use of my fluidized-solids system provides a means for eliminating the necessity of preheating equipment to add the increment of heat and to remove it after the reaction. All in all, the features of my invention cooperate to produce a novel and useful process and means for the generation of gas mixtures comprising hydrogen and carbon monoxide in the desired ratios.

The specific example described in more or less detail is for the purposes of illustration only, and it should be understood that the invention is not limited thereto, inasmuch as other modifications and equivalents will readily become apparent from the above description to those skilled in the art.

What I claim is:

A process for converting hydrocarbon gases predominantly into hydrogen and carbon monoxide which comprises the steps of supplying a gaseous hydrocarbon including methane and an oxygen-containing gas to a gas generation zone at about room temperature, maintaining a quantity of finely divided catalytic solids comprising a group VIII metal within said zone in a dense turbulent suspended phase, reacting said methane and oxygen while in contact with said solids at a superatmospheric pressure of approximately 30 p. s. i. gauge, supplying about 0.6 mole of oxygen per mole of methane to attain an equilibrium reaction temperature of about 1530° F. favoring the conversion of the methane into about 92% hydrogen and carbon monoxide in the molal ratio of about 2:1, and maintaining said catalytic solids comprising a group VIII metal at the equilibrium reaction temperature by supplying said gaseous hydrocarbons and oxygen at a temperature sufficiently below the equilibrium reaction temperature whereby excess exothermic heat of reaction is extracted and by withdrawing gases including reaction products and unreacted feed from said generation zone at said equilibrium temperature.

JOHN A. PHINNEY.

REFERENCES CITED

The following references are of record in the file of this patent:

UNITED STATES PATENTS

| Number | Name | Date |
|---|---|---|
| 1,918,254 | Faber | July 18, 1933 |
| 1,979,820 | Bowling | Nov. 6, 1934 |
| 1,984,380 | Odell | Dec. 18, 1934 |
| 2,051,363 | Beekley | Aug. 18, 1936 |
| 2,199,475 | Wilcox | May 7, 1940 |
| 2,327,175 | Conn | Aug. 17, 1943 |